United States Patent [19]
Michalske et al.

[11] Patent Number: 5,246,746
[45] Date of Patent: Sep. 21, 1993

[54] METHOD FOR FORMING HERMETIC COATINGS FOR OPTICAL FIBERS

[76] Inventors: Terry A. Michalske, P.O. Box 1042, Cedar Crest, N. Mex. 87008; Robert R. Rye, 1304 Espanola NE., Albuquerque, N. Mex. 87110; William L. Smith, 9916 Fostoria Rd., NE., Albuquerque, N. Mex. 87111

[21] Appl. No.: 691,962

[22] Filed: Apr. 26, 1991

[51] Int. Cl.$^5$ ............................................. B05D 5/06
[52] U.S. Cl. .................................... 427/593; 427/163; 427/166; 427/249; 427/250; 427/251; 427/252; 427/255.2; 427/255.5
[58] Field of Search ........ 427/163, 166, 244, 250–252, 427/255.2, 255.5, 249, 592, 593

[56] References Cited

U.S. PATENT DOCUMENTS

| | | | |
|---|---|---|---|
| 4,358,473 | 11/1982 | DeBolt et al. | 427/249 |
| 4,788,082 | 11/1988 | Schmitt | 427/249 |
| 4,938,940 | 7/1990 | Hirose et al. | 427/249 |
| 4,988,421 | 1/1991 | Drawl et al. | 427/249 |

OTHER PUBLICATIONS

Jansen, "The deposition of diamond . . .," *J. Vac. Sci. Technol. A.*, vol. 8, No. 5, Sep./Oct. 1990, pp. 3785–3790.
Kurkjian et al, "Strength and fatigue give . . . ," *J. of Lightwave Tech.*, vol. 7, No. 9, Sep. 1989, pp. 1360–1370.
Matsumura, "Study of catalytic chemical . . . ," *J. Appl. Phys.*, 65 (11), Jun. 1, 1989, pp. 4396–4402.
Matsumura, "Low temperature deposition of . . . ," *Jap. J. Appl. Phys.*, vol. 28, No. 10, Oct. 1989, pp. 2157–2161.
Smithgall et al, "Drawing Lightguide Fiber," *The Western Electric* Winter 1980, pp. 49–60.
Partus et al, "Lightguide Preform Manufacture," *The Western Electric Engineering*, Winter 1980, pp. 39–41.

*Primary Examiner*—Janyce Bell
*Attorney, Agent, or Firm*—Timothy D. Stanley

[57] ABSTRACT

A method for forming hermetic coatings on optical fibers by hot filament assisted chemical vapor deposition advantageously produces a desirable coating while maintaining the pristine strength of the pristine fiber. The hermetic coatings may be formed from a variety of substances, such as, for example, boron nitride and carbon.

19 Claims, 1 Drawing Sheet

METHOD FOR FORMING HERMETIC COATINGS FOR OPTICAL FIBERS

BACKGROUND OF THE INVENTION

1. Field of the Invention

The present invention relates to a method for forming hermetic coatings for optical fibers. More specifically, the present invention relates to a method for forming hermetic coatings on optical fibers by filament assisted chemical vapor deposition.

2. Description of Related Art

The reliable performance of silica-based optical fibers is sensitive to factors that effect the long term mechanical strength and time dependent degradation of the optical transmission. It has been shown that exposure to water can reduce the strength of glass fibers with time under stress. It is also known that exposure of the optical fibers to hydrogen gas can degrade the optical transmission of the optical cables. Because of these effects, it is extremely important to isolate the fibers from the surrounding environment by applying a hermetic coating to the glass fiber. To date, coatings made from boron nitride (BN), carbon (C), silicon carbide (SiC) and many other materials have been applied to optical fibers. Although many of these coating have been shown to provide adequate hermetic barriers, in every case they result in a substantial decrease in the measured strength as compared with pristine glass fibers. Kurkjian et al, "Strength and fatigue of silica optical fibers" *J. of Lightwave Tech.*, vol. 7, no. 9, Sep. 1989, pp. 1360-1370. Pristine glass fibers give measure strengths equal to about 10 GPa while the hermetic coated fibers yield strengths in the range of 2-4 GPa.

Other methods for the deposition of other substances have also been studied, such as for example with regard to the production of a coating including carbon (Jansen, "The deposition of diamond films by filament techniques," *J. Vac. Sci. Technol. A*, vol. 8, no. 5, Sep/Oct 1990 pp. 3785-3790), silicon (Matsumura, "Study on catalytic chemical vapor deposition method to prepare hydrogenated amorphous silicon", *J. Appl. Phys.*, 65(11), 1 Jun. 1989, pp. 4396-4402), and silicon nitride (Matsumura, "Low temperature deposition of silicon nitride by the catalytic chemical vapor deposition method," *Jap. J. Appl. Phys.*, vol. 28, no. 10, Oct., 1989, pp. 2157-2161). U.S. patent application Ser. No. 07/592,457 discloses a method for forming boron nitride coatings using a hot filament, but does not disclose application to optical fibers.

In view of the above, it is desirable to provide a method for forming hermetic coatings for optical fibers which overcome the above-noted deficiencies recognized in conventional techniques with regard to increased fiber strength as compared to pristine glass fibers. It is further desirable to obtain a method which is simple and economical as compared to conventional techniques.

SUMMARY OF THE INVENTION

Therefore, it is the object of the present invention to provide a method for forming hermetic coating for optical fibers which overcomes problems associated with conventional techniques such as those discussed above.

It is a further object of the present invention to provide a method for forming hermetic coatings for optical fibers by hot filament assisted chemical vapor deposition.

It is another object of the present invention to provide a method for forming hermetic coatings on optical fibers so that the fibers exhibit improved strength.

It is yet another object of the present invention to provide a method for forming hermetic coatings on optical fibers including boron nitride and carbon.

The foregoing objects and others are accomplished in accordance with the present invention, generally speaking, by providing a method for forming hermetic coatings on optical fibers by hot filament assisted chemical vapor deposition.

Further scope of the applicability of the present invention will become apparent from the detailed description and drawing provided below. However, it should be understood that the detailed description and specific examples, while indicating preferred embodiments of the invention, are given by way of illustration only, since various changes and modifications in the spirit and scope of the invention will become apparent to those skilled in the art from this detailed description.

BRIEF DESCRIPTION OF THE DRAWINGS

The invention is further illustrated in the accompanying drawing wherein.

DETAILED DESCRIPTION OF THE INVENTION

Figure 1:
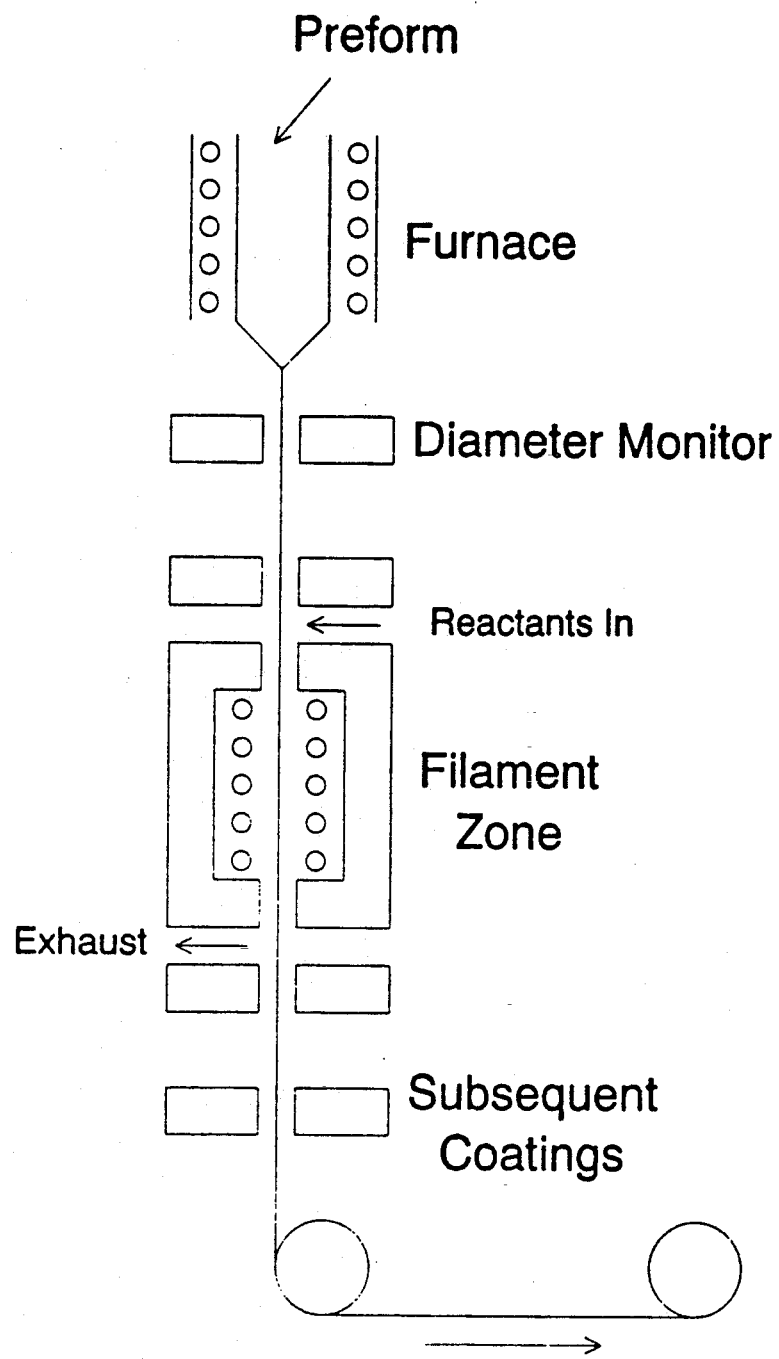
FIG. 1 is a schematic drawing of an apparatus for carrying out the method of the present invention.

The present invention is generally directed to a method for forming hermetic coatings on optical fibers. The hermetic coatings are formed by employing hot filament assisted chemical vapor deposition. A significant advantage associated with the coating method of the present invention is the production of a desirable coating on the optical fiber while maintaining a significant proportion, e.g. over 75%, of the pristine strength of the pristine fiber. It appears that the improved coated fiber strength resulting from the employment of the hot filament assisted chemical vapor deposition technique of the present invention is due to the low fiber surface temperature required by this method.

The deposition method of the present invention involves use of a hot filament to excite a precursor substance in the form of a gas and deposit the substance as a coating on a substrate, i.e. an optical fiber, in close proximity to the filament. The hot filament employed in the method of the present invention is preferably a refractory metal which is resistively heated. Generally, the filament is heated to a temperature of approximately 1000°-2000° C., and more preferably 1350°-1450° C. for boron nitride coatings and 1800.-1900.C for carbon coatings. Preferably, the hot filament is within about 0.5 mm to 100 mm of the substrate, and more preferably within 3 mm to 10 mm.

The substance used to form the hermetic coatings in the method of the present invention include, for example, boron nitride, carbon, silicon, silicon nitride, titanium dioxide, boron carbide, tin oxide and aluminum. The most preferred substances used to form the coatings are boron nitride and carbon. The coatings produced according to the present invention may be used as the sole barrier coating on the fiber or used in conjunction with other organic or inorganic protective barriers, such as organic polymer coatings. In all cases, the coatings described herein would be applied first to the pristine glass surface and any subsequent protective coating would be applied over this layer. In the case of multiple coating designs, the initial coating that is applied utilizing the heated filament method would serve to protect the intrinsic properties of the glass surface. The thickness of the coating is generally 50 to 50,000 angstroms and more preferably 1,000 to 5,000 angstroms.

The substrate on which the hermetic coatings are formed in accordance with the method of the present invention is preferably a silica based optical fiber with high strength and low optical loss. During the method of the present invention, the optical fiber substrate is maintained at a temperature of about 20° to 1000° C. and more preferably 300° to 500° C.

EXAMPLES

The application of the coating method of the present invention was investigated on short segments of glass fiber that were produced in a controlled environment reaction chamber. Wave guide quality silica glass fibers were placed within an array of four tungsten filaments. The filament array was heated to a temperature of approximately 1400.C and borazine gas was admitted into the chamber. This process results in the deposition of BN on the fiber surface. After coating, the fibers were tested for their mechanical strength. A comparison of coated and uncoated fibers shows that a filament produced BN coating and a filament produced carbon coating in accordance with the present invention preserved a strength of greater than 7.5 GPa even when tested in a chemically aggressive environment, such as water vapor. Table I below shows representative strength data for coated and uncoated fiber.

TABLE I

| Fiber Strength in 6% Relative Humidity | |
|---|---|
| Fiber Condition | Strength |
| Uncoated | 6.0 GPa |
| BN Coated | 8.0 GPa |
| C Coated | 9.5 GPa |
| Intrinsic (in vacuum) | 10.5 GPa |

The above-described method was conducted on small test segments of fiber. Of course, the same coating method which utilizes an array of heated filaments and the introduction of precursor gas may be used to continuously coat long lengths of optical fiber as it is being drawn. In this case, the as drawn fiber would simply be pulled through the filament array under an overpressure of the gas, such as borazine for the production of BN and cyclopentane for the production of C..

An illustration of this process is shown in FIG. 1, wherein the description of the preform, furnace, diameter monitor, and subsequent coating components are designed and specified according to standard industrial practice as described, for example, in Smithgall & Myers, "Drawing Lightguide Fiber," *The Western Electric Engineer*, Winter 1980, pp. 49-60; and Partus & Saifi, "Lightguide Preform Manufacture," *The Western Electric Engineer*, Winter, 1980, pp. 39-41. The filament zone components, which are an embodiment of a filament assisted hermetic coating process, are placed between the diameter monitor and subsequent coating components. This filament component is comprised of heating elements, a gas enclosure, a gas introduction and exhaust apparatus, and devices to monitor and control the processing parameters.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method for forming a hermetic coating on an optical fiber which comprises:

providing an optical fiber and what filament in a gas chamber, wherein said filament is heated to a temperature of at least 1000° C.; and introducing a precursor of a substance in the form of a gas to the gas chamber so as to heat said gas with said hot filament effective for depositing a hermetic coating of said substance on said optical fiber wherein the substance used to form said hermetic coating is selected from the group consisting of boron nitride, carbon, silicon, silicon nitride, titanium diioxide, boron carbide, tin oxide an daluminum.

2. The method according to claim 1, wherein the hot filament is heated to a temperature of about 1000°-2000° C.

3. The method according to claim 1, wherein the hot filament is heated to a temperature of about 1350°-1450° C.

4. The method according to claim 1, wherein the hot filament is heated to a temperature of about 1800°-1900° C.

5. The method according to claim 1, wherein the hot filament is within about 0.5 mm to 100 mm of the optical fiber.

6. The method according to claim 1, wherein the hot filament is within about 3 mm to 10 mm of the optical fiber.

7. The method according to claim 1, wherein the hermetic coating is formed to be 50 to 50,000 angstroms thick.

8. The method according to claim 1, wherein the hermetic coating is formed to be 1,000 to 5,000 angstroms thick.

9. The method according to claim 1, wherein the optical fiber is maintained at a temperature of about 20° to 1000° C. during deposition of the hermetic coating thereon.

10. The method according to claim 1, wherein the optical fiber is maintained at a temperature of about 300° to 500° C. during deposition of the hermetic coating thereon.

11. A method for forming a hermetic coating on an optical fiber which comprises:

providing an optical fiber and a hot filament in a gas chamber, wherein said filament is heated to a temperature of about 1000°-2000° C.; and introducing a precursor of a substance in the form of a gas to the gas chamber so as to heat said gas with said hot filament effective for depositing a hermetic coating of said substance on said optical fiber, wherein the substance used to form a hermetic coating is selected from the group consisting of boron nitride, carbon, silicon, silicon nitride, titanium dioxide, boron carbide, tin oxide and aluminum.

12. The method according to claim 11, wherein the substance used to form said hermetic coating is boron nitride.

13. The method according to claim 11, wherein the substance used to form said hermetic coating is carbon.

14. The method according to claim 11, wherein the hot filament is heated to a temperature of about 1350°-1450° C. and wherein the substance used to form said hermetic coating is boron nitride.

15. The method according to claim 11, wherein the optical fiber is maintained at a temperature of about 1800°-1900° C. and wherein the substance used to form said hermetic coating is carbon.

16. The method according to claim 11, wherein the optical fiber is maintained at a temperature of about 20° C. to 1000° C. during deposition of the hermetic coating thereon.

17. The method according to claim 11, where the optical fiber is maintained at a temperature of 300° C. to 500° C. during deposition of the hermetic coating thereon.

18. The method according to claim 14, where the optical fiber is maintained at a temperature of 300° C. to 500° C. during deposition of the hermetic coating thereon.

19. The method according to claim 15, wherein the optical fiber is maintained at a temperature of 300° C. to 500° C. during deposition of the hermetic coating thereon.

* * * * *